US010691820B1

(12) United States Patent
Blum et al.

(10) Patent No.: US 10,691,820 B1
(45) Date of Patent: *Jun. 23, 2020

(54) REAL-TIME DISTRIBUTION OF MESSAGES VIA A NETWORK WITH MULTI-REGION REPLICATION IN A HOSTED SERVICE ENVIRONMENT

(71) Applicant: PubNub Inc., San Francisco, CA (US)

(72) Inventors: Stephen Blum, San Francisco, CA (US); Todd Greene, San Francisco, CA (US)

(73) Assignee: PubNub Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/809,340

(22) Filed: Nov. 10, 2017

Related U.S. Application Data

(63) Continuation of application No. 13/625,314, filed on Sep. 24, 2012, now Pat. No. 9,965,640.

(60) Provisional application No. 61/538,516, filed on Sep. 23, 2011.

(51) Int. Cl.
*H04L 29/06* (2006.01)
*G06F 21/62* (2013.01)

(52) U.S. Cl.
CPC ........ *G06F 21/6218* (2013.01); *H04L 63/107* (2013.01)

(58) Field of Classification Search
CPC ............................ G06F 21/6218; H04L 63/107
See application file for complete search history.

(56) References Cited

U.S. PATENT DOCUMENTS

| | | | |
|---|---|---|---|
| 6,078,930 A * | 6/2000 | Lee | G06F 11/1415 |
| 6,446,092 B1 | 9/2002 | Sutter | |
| 7,149,783 B2 | 12/2006 | Frolik et al. | |
| 7,274,658 B2 | 9/2007 | Bornstein et al. | |
| 7,328,401 B2 | 2/2008 | Obata et al. | |
| 7,827,144 B1 * | 11/2010 | Saito | G06F 11/00 |
| | | | 707/638 |
| 13,478,841 | 7/2013 | Spitzer et al. | |
| 8,738,736 B2 | 5/2014 | Choi et al. | |
| 8,776,256 B2 | 7/2014 | Nguyen et al. | |
| 9,032,032 B2 | 5/2015 | Mills et al. | |
| 9,124,650 B2 | 9/2015 | Maharajh et al. | |
| 9,275,204 B1 * | 3/2016 | Orr | G06F 21/30 |
| 9,965,640 B1 * | 5/2018 | Blum | G06F 21/335 |

(Continued)

OTHER PUBLICATIONS

NPL Search (Google Scholar) (Year: 2020).*

(Continued)

*Primary Examiner* — John B King
*Assistant Examiner* — Richard W Cruz-Franqui
(74) *Attorney, Agent, or Firm* — Fox Rothschild LLP

(57) ABSTRACT

A message distribution system replicates a collection of messages across multiple regional data centers. When any of the data centers receives a message for distribution from an authorized publisher, it transmits the message to each of the other data centers so that the collection of messages is immediately replicated among each data center. When any data center determines that a subscriber is connected to it, that data center determines which messages in the data collection the subscriber is authorized to receive, and it automatically sends those messages to the subscriber.

13 Claims, 7 Drawing Sheets

(56) References Cited

U.S. PATENT DOCUMENTS

| | | | |
|---|---|---|---|
| 2001/0052015 A1* | 12/2001 | Lin | H04L 1/1635 709/226 |
| 2002/0099787 A1* | 7/2002 | Bonner | H04L 41/042 709/216 |
| 2002/0147929 A1 | 10/2002 | Rose | |
| 2002/0152257 A1 | 10/2002 | Frolik et al. | |
| 2002/0163882 A1 | 11/2002 | Bornstein et al. | |
| 2003/0072451 A1* | 4/2003 | Pimentel | H04L 63/08 380/270 |
| 2004/0158870 A1 | 8/2004 | Paxton et al. | |
| 2004/0196842 A1 | 10/2004 | Dobbins | |
| 2004/0225728 A1* | 11/2004 | Huggins | H04L 29/06 709/223 |
| 2005/0165778 A1 | 7/2005 | Obata et al. | |
| 2006/0004869 A1* | 1/2006 | Yuster | G06Q 30/00 |
| 2007/0061282 A1 | 3/2007 | Ganguly et al. | |
| 2007/0255682 A1* | 11/2007 | Brelsford | G06F 16/24556 |
| 2008/0086484 A1 | 4/2008 | Darnell et al. | |
| 2008/0256177 A1* | 10/2008 | Boberg | H04L 67/1095 709/203 |
| 2009/0043867 A1* | 2/2009 | Sharp | H04L 67/1095 709/218 |
| 2009/0094332 A1 | 4/2009 | Schemers, III et al. | |
| 2009/0235347 A1 | 9/2009 | Syed et al. | |
| 2009/0319356 A1 | 12/2009 | Spitzer et al. | |
| 2009/0327361 A1 | 12/2009 | Mills et al. | |
| 2010/0088389 A1 | 4/2010 | Buller et al. | |
| 2011/0185010 A1* | 7/2011 | Shatsky | H04L 65/80 709/203 |
| 2011/0225417 A1* | 9/2011 | Maharajh | G06F 21/10 713/150 |
| 2011/0296048 A1 | 12/2011 | Knox et al. | |
| 2012/0084264 A1* | 4/2012 | Henderson | H04L 67/06 707/672 |
| 2012/0117605 A1 | 5/2012 | Miao et al. | |
| 2012/0131139 A1* | 5/2012 | Siripurapu | G06F 16/951 709/217 |
| 2012/0131146 A1 | 5/2012 | Choi et al. | |
| 2012/0278898 A1* | 11/2012 | Nguyen | G06F 21/10 726/27 |
| 2012/0284290 A1* | 11/2012 | Keebler | G06F 16/958 707/756 |
| 2012/0303912 A1 | 11/2012 | Calder et al. | |
| 2014/0164380 A1* | 6/2014 | Pavlov | G06F 16/951 707/737 |
| 2014/0195847 A1* | 7/2014 | Webman | G06F 11/2094 714/6.22 |

OTHER PUBLICATIONS

Brian Oliver, Global Solutions Architect, Oracle Coherence presentation, Connecting Coherence Data Grids Over a Wide-Area Network, Jan. 2009, pp. 1-18.

Oracle® Fusion Middleware manual, Developing Web Applications, Servlets, and JSPs for Oracle WebLogic Server, 11g Release 1 (10.3.1), May 2009, Chapter 12, "Using the HTTP Publish-Subscribe Server", pp. 12-1 to 12-24.

Alex Russell et al., The Bayeux Specification, "Bayeux Protocol—Bayeux 1.0.0", Sep. 20, 2012, pp. 1-27, sv n. cometd.com/trunk/bay eux/bay eux.html.

* cited by examiner

US 10,691,820 B1

REAL-TIME DISTRIBUTION OF MESSAGES VIA A NETWORK WITH MULTI-REGION REPLICATION IN A HOSTED SERVICE ENVIRONMENT

RELATED APPLICATIONS AND CLAIM OF PRIORITY

This patent document claims priority to, and is a continuation of, U.S. patent application Ser. No. 13/625,314, filed Sep. 24, 2012, which claims priority to U.S. Provisional Patent Application No. 61/538,516, filed Sep. 23, 2011. The disclosures of the priority applications are fully incorporated into this by reference.

BACKGROUND

The present disclosure relates to methods and systems for distributing messages over wide area networks such as the Internet.

Cloud computing provides computation, software, data access, and storage services that do not require end-user knowledge of the physical location and configuration of the system that delivers the services. Cloud computing provides a way to increase capacity or add capabilities without investing in new infrastructure, training new personnel, or licensing new software.

Cloud computing provides a new supply, consumption, and delivery model for information technology (IT) services based on Internet protocols. It can take the form of web-based tools or applications that users can access and use through a web browser as if the programs were installed locally on their own computers. Applications and/or data are delivered through the Internet and are accessed from a web browser. The business software and data are stored on servers at a remote location. Typically, cloud computing infrastructures include services delivered through shared data centers and appear as a single point of access.

As the need increases to cheaply deliver, with low latency, large quantities of data to a multitude of global recipients over the Internet, improved message delivery methods and systems are desired to fulfill this need.

SUMMARY

A method and system for distributing messages via a network is described. The method includes receiving, at a first data center from a publisher, a number of messages to be published to a number of subscribers. The messages are saved in a data collection at the first data center and are sent in real time to at least a second data center so that the data collection is replicated among each of the data centers. The second data center receives a credential from a subscriber, verifies that the subscriber is an authorized subscriber, and selects the messages from the data collection that the subscriber is eligible to receive. The first and/or second data center automatically sends the selected messages to the subscriber via the network.

The system includes a plurality of data centers, each of which comprises an associated processor, a first computer-readable memory portion, and a second computer readable memory portion holding programming instructions. The programming instructions, when executed, instruct the associated processor to receive a plurality of messages to be published to a plurality of clients. The processor is also instructed to save the messages in a data collection in the data center's first computer-readable memory. The messages are transmitted, in real time, to each of the other data centers so that the data collection is replicated in each of the plurality of data centers. Based on a received subscriber credential, the processor is instructed to verify that the subscriber is an authorized subscriber and select one of the messages from the data collection that the subscriber is eligible to receive. The processor automatically sends the selected message to the subscriber via the network.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

The term "message" as used herein means one or more discrete bundles of data containing content and/or instructions, routing information, and authentication information. In some embodiments, at least some messages published in the system described below will have a size that is less than or equal to 7.2 kilobytes. The content (i.e., payload) of a message may be part of the message, routing and authentication information may be included in another part such as a header, and the entire payload and header may be wrapped in an envelope. Messages can optionally be encrypted, e.g. through SSL and AES encryption protocols. Messages can be formatted in a standard data-format (e.g., JSON, XML, HTML, and the like).

The term "customer" as used herein means an entity desiring, contracting, and providing consideration for a service. The consideration may be a payment, or agreeing to provide another item of value to the service, such as agreeing to view an advertisement, or agreeing to share certain data with the service. The term "subscriber" as used herein means an entity that receives published messages. The term "publisher" as used herein means an entity that originates, publishes or otherwise processes messages that are to be published.

As used in this document, a "cloud computing system" or "cloud application service" refers to one or more physical and/or logical computing devices that operate as a shared resource for multiple other computing devices. An example is a server on which an application is run or data is streamed, connected via an Internet protocol connection among several client computing devices. Examples of client devices include some computers equipped with a browser, smart phones and other networked devices, operating systems, and browsers. The client computers may run a specific application to receive the data, or they may simply open a window or other connection, such as via a browser, through which the client can view operation of the application on the remote server. With a cloud computing system, it may be possible to share services and/or data between within any one of the following layers, (i) client, (ii) application, (iii) platform, (iv) infrastructure and (v) server.

Cloud application services deliver software and/or data as a service over a network such as the Internet. For example, cloud platform services may deliver a computing platform and/or solution stack as a service.

Figure 1:
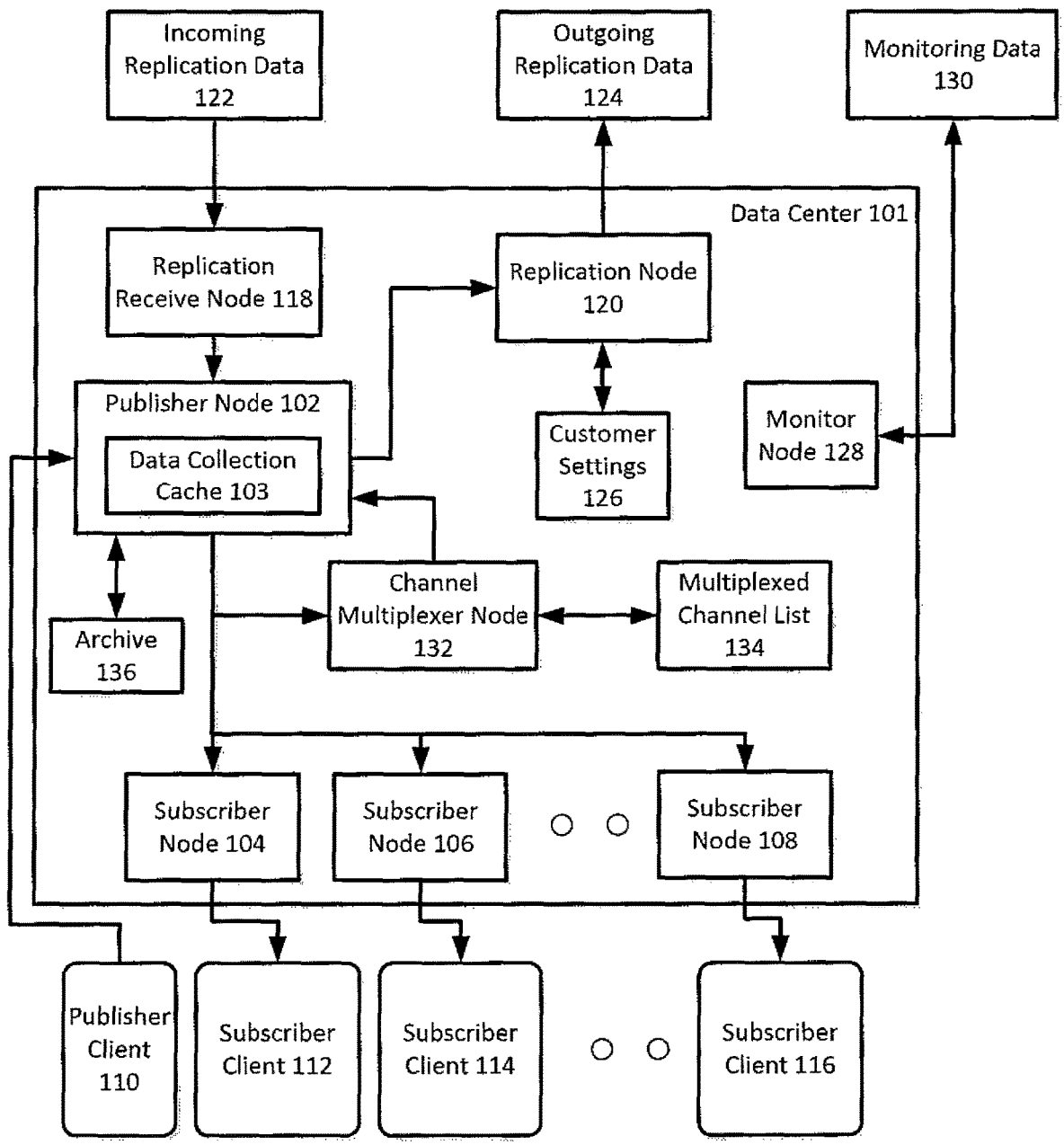
FIG. 1 depicts an embodiment of a data center.

FIG. 1 depicts an embodiment of a data center 101 that is part of a cloud computing service. In the embodiments described in this document, a cloud computing service will include or be connected to multiple data centers that are located in a variety of geographic regions. Each data center 101 may include various "nodes," which in this document refers to a process residing on one or more computing device containing a processor and/or computer-readable memory, along with programming instructions and/or data. The number of nodes that can reside on a particular device may depend on the number of processors, amount of memory, and/or the amount of data storage available on the computing device. The nodes in this embodiment include a publisher node 102, a number of subscriber nodes 104, 106, 108, a replication receive node 118, a replication broadcast node 120, a channel multiplexer node 132, and a monitor node 128.

Connected to the data center is any number of publisher clients 110 and any number of subscriber clients 112, 114, 116. The term "publisher" client refers to a client that directly or indirectly sends messages to the cloud computing service. The term "subscriber" client refers to a client that is receiving messages from the data center. Optionally, some clients may be both publishers and subscribers based on the action that they are performing at any given time. Each client will include a processor, user interface, computer-readable memory, and a communications connection to a network so that messages may be transmitted between the data center and the client. As indicated in FIG. 1, any number of subscriber nodes and clients may exist for a particular data center. Additionally, the number of publisher nodes and clients may vary. The embodiments are not limited in this regard. For example, multiple publisher nodes may operate in parallel to publish messages. In such situations, a load balancer (not shown in FIG. 1) may be used to distribute messages across all the publisher nodes. This also shows that the data center may be a multi-tenant data center that stores and distributes messages from a variety of publishers.

Data center 101 also includes replication broadcast node 120, which stores and transmits outgoing replication data 124, and replication receive node 118, which receives and stores incoming replication data 122. In embodiments, data center 101 also includes a monitor node 128 which sends and receives monitoring data 130. Note that it is not necessary that each node include a processor and/or computer-readable memory for that of other nodes in the data center. Indeed, a single node may serve multiple functions depending on the program instructions that it runs at any given time. For example, a single server may contain programming instructions that allow the server to operate as a subscriber node, a publishing node, a replication broadcast node and/or a replication receive node.

As will be explained in greater detail below, the subscriber clients 112, 114, 116 connected to subscriber nodes 104, 106, 108 may be subscribed to particular channels. A channel is a named destination to which clients subscribe and/or publish messages. A client may connect to a subscriber node using any now or hereafter known protocol. For example, the subscriber node may allow a long-lived connection such as long-polling, COMET, WebSockets, SPDY, BOSH, or other techniques. In some embodiments, any number of subscriber clients may subscribe to a channel that publishes messages concerning a particular television show that the users of subscriber clients 112, 114, 116 are watching. As events occur in the television show, a publisher client 110 may wish to publish a message that will instruct the subscriber clients 112, 114, 116 (e.g., an application running on a smart phone, tablet, and/or computer) to display a poll requesting the users' opinion concerning the event. For example, an instruction to ask "Do you like the singer's performance" may be published for a live music contest.

In another embodiment implementing a voice-over-IP (VoIP) phone network, any number of subscriber clients within the network may subscribe to individual dedicated channels. This embodiment illustrates that subscriber and publisher identities need not be static and can change based on whether the client is sending or receiving a message. When a VoIP software caller dials another user, the caller can be represented as a publisher client 110. The VoIP caller (i.e. the publisher client) will publish a message to a subscriber client 112 (i.e. the VoIP call receiver). The message would trigger the VoIP phone on subscriber client 112 to ring. If the user of the VoIP phone subscriber client 112 answers the phone, the phone would become a new publisher client and publish an answer message to VoIP caller, now a subscriber client. In this embodiment each user device is connected as a publisher client and as a subscriber client.

To publish a message to one or more subscriber clients 112, 114, 116, the publisher client 110 publishes a message on one or more appropriate channels to reach the clients. In addition, each subscriber client also subscribes to a channel to receive messages. In some embodiments, a channel may be exclusive to a client, such that the particular client is the only subscriber. This channel is used if a publisher client 110 wishes to send a message to only one subscriber client. As can be seen, any combination of subscriber clients may be subscribed to a channel at any particular time. The embodiments are not limited in this regard.

In an example, publisher client 110 may transmit a message to the data center 101, which receives the message through publisher node 102. Publisher node 102 in turn transmits the message to the appropriate channel to reach subscriber nodes 104, 106, 108. Subscriber nodes 104, 106, 108 include data collection caches 105, 107, 109 where messages are temporarily stored for a predetermined duration. In addition, the message is sent to replication node 120. Based on customer settings 126, defined by a customer that may or may not be a subscriber or publisher, the replication node 120 determines whether the published message should be replicated to other data centers (not shown in FIG. 1). For example, if a customer decides that published messages to their subscribers should be replicated to some or all of the data centers, the replication node will broadcast the message as outgoing replication data 124 to the other data centers that are to replicate the broadcast message. Publisher node 102 is also connected to archive 136 to store messages that are indicated for longer term storage and retrieval. The data collection caches 105, 107, 109 are only intended for short term storage and are regularly purged. The archive 136 is used to store messages that are intended to remain available beyond the time provided by the data collection caches 105, 107, 109. One of ordinary skill will recognize that the archive can be located on the data center or on a remote computing device or node. The purging, archive, and retrieval processes are described in greater detail below.

Conversely, if one of the other data centers broadcasts a message that is to be replicated on the first data center 101, the replication receive node 118 will receive the broadcast message as incoming replication data 122. This broadcast message will then be sent to the publisher node 102 and published to the subscriber clients 112, 114, 116 through subscriber nodes 104, 106, 108.

Publisher client 110 and subscriber clients 112, 114, 116 are associated with a customer. For example, a customer may wish to implement the data distribution system described herein. The customer is assigned with a unique domain name or subdomain name that is used by the customer's clients (both publishers and subscribers) to connect to data center 101. As used herein, a domain or subdomain name can be any kind of address, e.g. any computer, network, or internet address that allows the client to identify and establish a connection with one or more remote computing devices. The embodiments are not limited in this regard. As discussed above, whether messages are replicated can be based on customer settings 126. Customer settings 126 may also include one or more dedicated domain or subdomain names. These dedicated domains or subdomains will be used to route the publisher and subscriber clients to the appropriate data centers. In an embodiment, the domain or subdomain name used by the clients is resolved to a one or more data centers using one of many load balancing algorithms e.g. round-robin, least-loaded, and the like. The selection of data centers may be predetermined or pre-configured in customer settings 126. In another embodiment, the domain or subdomain name used by the clients will resolve to the data center nearest to the client device, e.g. using a geographic-DNS service. One of skill in the art will recognize that the customer settings determining how to resolve the unique customer domain name can be changed depending on the desires and/or needs of the customer.

Monitor node 128 monitors for monitoring data 130 transmitted from a data center routing node (not shown in FIG. 1). Monitoring data 130 may be a small packet (e.g. a ping packet) that is received by monitor node 128. Monitor node 128 then sends another small packet back to the data center routing node. The purpose of the monitor node is to inform the data center routing node that the data center is active. This information is used to aid the data center routing node to determine the closest active data center for publishers and subscribers connecting to channels that enable multi-region replication and to perform associated fail-over operations described below.

As discussed above, any combination of subscriber clients may be subscribed to a channel at any particular time. Conversely, a subscriber client may subscribe to any combination of channels. In an embodiment, multiple channel messaging is handled by a channel multiplexer node 132 which creates and manages traffic on multiplexed channels. Channel multiplexer node 132 is coupled with a multiplexed channel list 134. Multiplexed channel list 134 may be a database or table that relates each multiplexed channel with the channels that are being multiplexed and allows channel multiplexer node 132 to easily determine whether a particular channel is being multiplexed.

For example, publisher client 110 may publish to channels A, B, and C. Subscriber client 112 may wish to subscribe to channels A and B and, therefore, receive messages published to either channel. Channel multiplexer node 132 will automatically create a new multiplexed channel AB when subscriber client 112 subscribes to both channels. When a message is published by publisher node 102 on channels A, for example, channel multiplexer node 132 checks the multiplexed channel list 134 to determine if channel A is part of a multiplexed channel. Since channel A is being multiplexed into channel AB, any message published on channel A will be republished by channel multiplexer node 132 to channel AB. A similar process will be followed for any messages published on channel B. However, any message published on channel C will not be republished since channel C is not part of any multiplexed channel.

Figure 2:
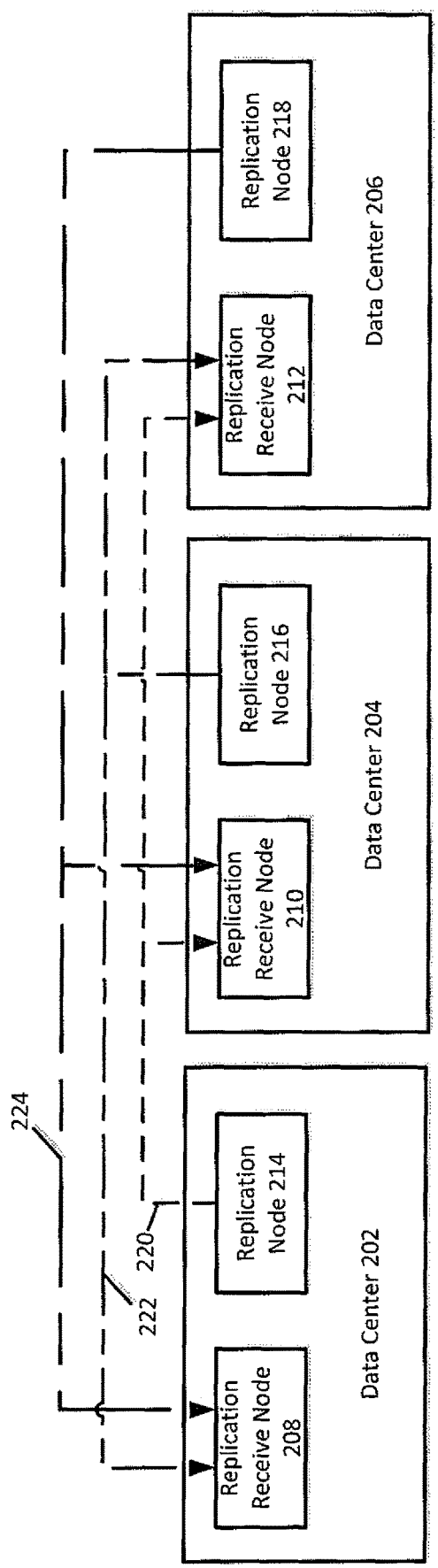
FIG. 2 depicts an embodiment of a data distribution system.

Referring now to FIG. 2, multiple data centers 202, 204 206 are depicted. These data centers are communicatively connected to each other, either directly or indirectly via one or more data connections 220, 222, 224. Data center 202 includes replication receive node 201 and replication broadcast node 214. Data center 204 includes replication receive node 210 and replication broadcast node 216. Data center 206 includes replication receive node 212 and replication broadcast node 218. As shown in FIG. 2, replication broadcast node 214 of data center 202 is connected with replication receive node 210 of data center 204 and replication receive node 212 of data center 206 through data connection 220. The replication receive nodes 210, 212 of data centers 204, 206 are also connected to the respective replication broadcast nodes of the other two data centers in a similar fashion. Any number of data centers may be connected together and the embodiments are not limited in this regard.

To replicate a published message, such as that published by publisher node 110 in the example described above in reference to FIG. 1, replication receive node 214 sends the message data through data connection 220. The message is received by replication broadcast nodes 210, 212 of data centers 204, 206. Data centers 204, 206 then broadcast the message to subscriber clients (not shown in FIG. 2) similarly to that described above in reference to FIG. 1. The replication nodes 216, 218 of data centers 204, 206 replicate messages in a similar fashion.

The process described above may apply to each message that is designated to be part of a replication service, so that each data center maintains a replicated collection of data that is common to all of the data centers. As soon as a designated message is received by one of the data centers, the data center broadcasts it to all other data centers. The data center may determine whether the message is eligible for replication. It may do this based on the metadata or other data contained within the message, such as a type of message, a publisher identifier, an indication of whether the publisher has subscribed to a data service, or some other data. Alternatively, the system may determine that a message is eligible for replication if the message was received on a channel that is designated for such service. If the message is not eligible for replication, the receiving data center may simply store it and broadcast it on one or more subscriber channels without replicating that message to the other data centers' data collections.

Figure 3:
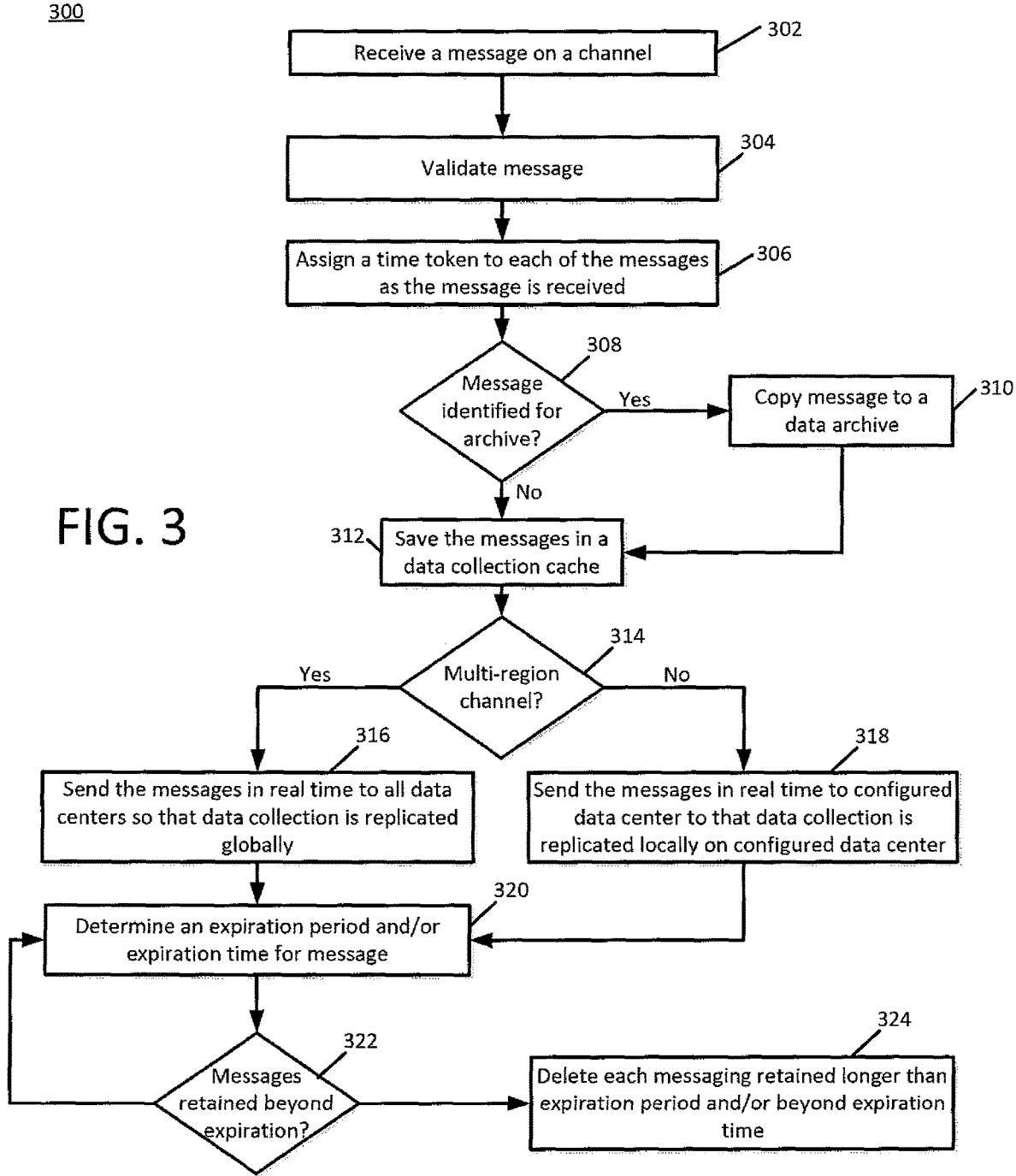
FIG. 3 is a flow chart depicting a process for use in a data center.

Referring now to FIG. 3, a flow chart is presented depicting a process 300. Process 300 concerns the operation of a data center, e.g. data center 101 of FIG. 1, when a message is received from a publisher client. As discussed above, the publisher client publishes messages on one or more channels to which subscriber clients have subscribed. At step 302, a publisher node receives the message from the publisher client on a channel. In step 304, the message is validated. Message validation may include determining whether the publisher client sending the message is an authorized user, for example. Message format validation, customer/publisher/subscriber key validation, encryption, and the like may also occur at step 304. If the message is invalid, it is discarded. If the message is valid, a time token is assigned to the message in step 306. The time token may be an indicator of a time that the message was received by a data center, or may be a predetermined indicator value, e.g. an arbitrary value which cannot be generated through the typical time stamping process. The time token may include any number of digits. In an embodiment, the time token includes 17 digits and can identify a particular time of receipt to the nanosecond. In some embodiments, the time token may be synchronized to a universal benchmark that applies regardless of the region in which the data center is located, such as Coordinated Universal Time (UTC). Additionally, a time token may be returned to the publisher node and/or publisher client when the data center receives messages to publish.

The time token assigned at step 306 serves multiple purposes. One purpose is to uniquely identify each message on a particular data center. Although it is possible for two messages to arrive at the same data center from the same publisher and/or on the same channel at the same exact time down to the nanosecond, it is highly unlikely. Further, adding additional information such as an identification of the channel and/or the publisher allows for further differentiation even in the event of truly simultaneous message receipt. Another purpose of the time token is to provide resiliency of service for devices with unreliable internet connections, such as mobile phones. Since each message is likely to have a unique time token, a subscriber client can determine which message was the last that it received prior to Internet connection disruption. The subscriber client can then send a time token of the last received message along with the request for connection. The data center can use this information to locate messages have been published since the device was disconnected, e.g. to help with message delivery to mobile devices that are prone to frequent network disconnections. The data center can then transmit these messages to the subscriber client to "catch up" with the real-time message stream. This process is discussed in further detail below in reference to FIG. 4.

In step 308, a determination is made whether the message has been identified for archiving. Archiving can be determined, for example, through publisher client settings or customer settings. If the message is to be archived (308: Yes), the message is copied, at step 310, to a data archive that is a relatively permanent of data storage unit in one or more of the data centers. The data archive may be located at the local data center, a remote data center, or some other server location. The data archive is typically not replicated at each data center, or if it is replicated at another data center the replication may not be done using the real-time broadcasting methods described above. At step 312, after the message is archived, the message is saved in one or more data collections in one or more subscriber nodes in the local data center. As used herein, the data collection is a short-lived data cache that holds data for a relatively short amount of time. Alternatively, if the message is not identified for archiving (308: No), the process 300 immediately continues to step 312 where the message is then saved in the data collection for publishing and replication (if eligible for replication).

In step 314, a determination is made whether the message is being published on a multi-region channel. This determination is made based on customer settings. If the customer has enabled MRR on the channel (314: Yes), then the messages are sent at step 316 to the subscriber channels, as well as other data centers (or at least to selected data centers) so that the data collection for the channel is replicated on all appropriate data centers. The message can be replicated globally, i.e. to all data centers world wide, or replicated to selected data centers, e.g. only to European data centers, etc. If the message is not eligible for MRR (i.e., if the channel has not been enabled for MRR) (314: No), the message is published locally in the configured data center at step 318.

In some embodiments, a message may contain metadata indicating that it is not to be broadcast to all customers worldwide at a single time. For example, a message associated with a television program may require that the message be broadcast to subscribers when the program airs on local television stations in the subscriber's time zone. If so, then the data center may incorporate a delay and not publish the message on subscriber channels until a later time, such as a time equal to the message's time token plus a delay period (e.g., one hour). This will allow the messages to be broadcast on the cloud network channels at a time that is appropriate for the data center's local time zone. However, the system may broadcast the message to other data centers at any time, typically without delay.

At step 320, an expiration period and/or expiration time is determined for messages at any data center. This expiration limit may be an amount of time elapsing from the receipt of the messages or may be based on the occurrence of a particular event. For example, messages published to a channel established for a particular television program may expire after a period time following the end of the television program. The embodiments are not limited in this regard.

In step 322, it is determined whether any messages have been retained beyond the expiration limit. If any messages have been retained beyond the expiration limit, those messages are deleted, i.e., purged from the data center, at step 324. The process of purging old messages may occur at each data center within relatively a short period of time so that each data center's data collection remains "replicated", i.e., substantially consistent with the other data centers' data collections. Since each message includes a time token, this termination may be relatively simple. For example, if the expiration period is three hours, all messages with time tokens indicating retention beyond three hours are selected and deleted in step 324. Alternatively, if the messages were published on a channel where messages expire at a predetermined time, all messages on the channel may be deleted at that time.

Figure 4:
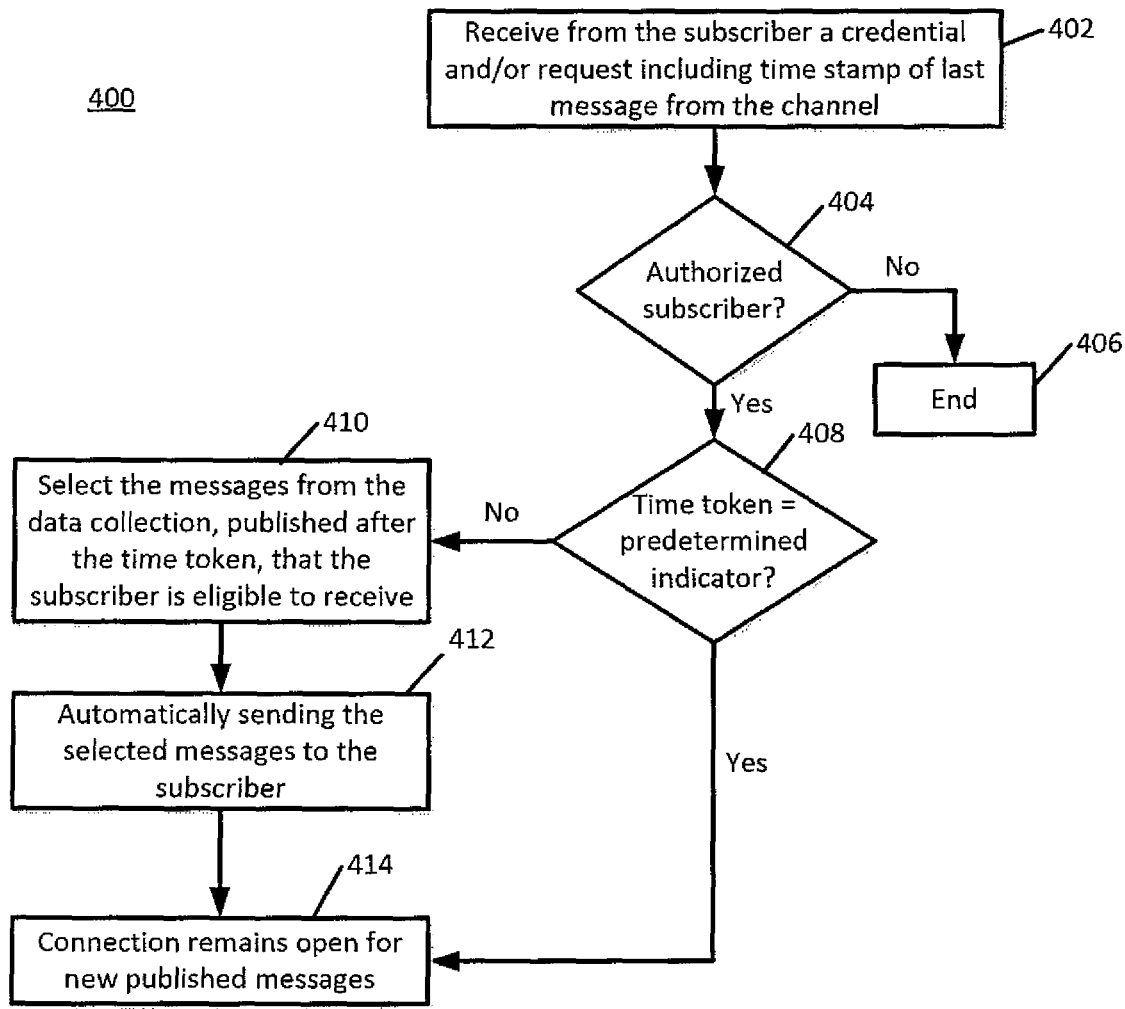
FIG. 4 is a flow chart depicting a process for use in a data center.

Referring now to FIG. 4, a flow chart depicting process 400 is presented. Process 400 represents what may happen when a request is received from a subscriber client, or when a subscriber connects to a channel on which one of the data centers broadcasts messages. At step 402 a request is received from a subscriber client. The request may include one or more subscriber credentials and, if the request is a reconnection request, a time token of the last message received by the subscriber client. Examples of subscriber credentials may be subscriber identification keys, encryption keys, or any other form of electronic credential that the system may require. The embodiments are not limited in this regard.

At step 404, after receiving the request from the subscriber client, the request may be validated to confirm that the subscriber is authorized to use the service (i.e., receive one or more message streams). If not (404: No), the request is discarded and/or copied to a storage location for further analysis at step 406. If the subscriber is authorized to use the service (404: Yes), it is determined at step 408 whether the time token is a predetermined indicator value. For example, a predetermined indicator time token value in the request message can indicate that the subscriber request is for an initial connection. As discussed above, the predetermined indicator value can be any value that would not occur as part of the normal time token process. In an embodiment where the time token includes 17 digits, a predetermined indicator value could be all zeros. Since any reconnection request would include a valid, non-arbitrary (i.e. not predetermined) time token indicating the receipt time of the last message received, the predetermined time token value can indicate a request for a new or initial connection.

Referring again to FIG. 4, if the time token is not a predetermined indicator value (408: No), the process 400 continues to step 410, where messages that were published after the time indicated by the time token and that the subscriber client is eligible to receive are selected from the data collection in the subscriber node. In an embodiment, the time token value uniquely indicates the last message received by the subscriber client. This may correspond to the situation where the subscriber client loses a connection with the data center, e.g. when the communication device on which the subscriber client is running suffers a communications disruption. Upon receipt of the request that includes a valid time token, the data center will send all messages that were published since the time indicated in the time token. In other embodiments, the subscriber client may include a time token of a particular point in time. Again, upon receipt of the request, the data center will send all messages published after the time indicated in the time token. As noted above, however, messages will be periodically purged from the data collection cache in the data center. Therefore, if the time indicated by the time token occurs prior to the earliest message in the data collection cache, the data center will send all messages that are still present in the cache.

Referring again to FIG. 4, at step 412, the selected messages are sent to the subscriber client. In step 414, the connection remains open for transmission of any additional messages that are published. In one embodiment optimized for low latency and high speed, no receipt or other delivery confirmation will be returned to the data center from the subscriber client. In this embodiment, a time token is provided to the subscriber node only when a reconnection occurs. Another embodiment will return a delivery confirmation from the subscriber client for every message received. In this embodiment, a time token is returned by the subscriber client for each message received or a subset thereof. If the time token is a predetermined indicator value (408: Yes), the process then proceeds directly to step 414 where the connection remains open for additional published messages. Additionally, a confirmation may or may not be sent on a per message or per request basis. The embodiments are not limited in this regard.

Figure 5:
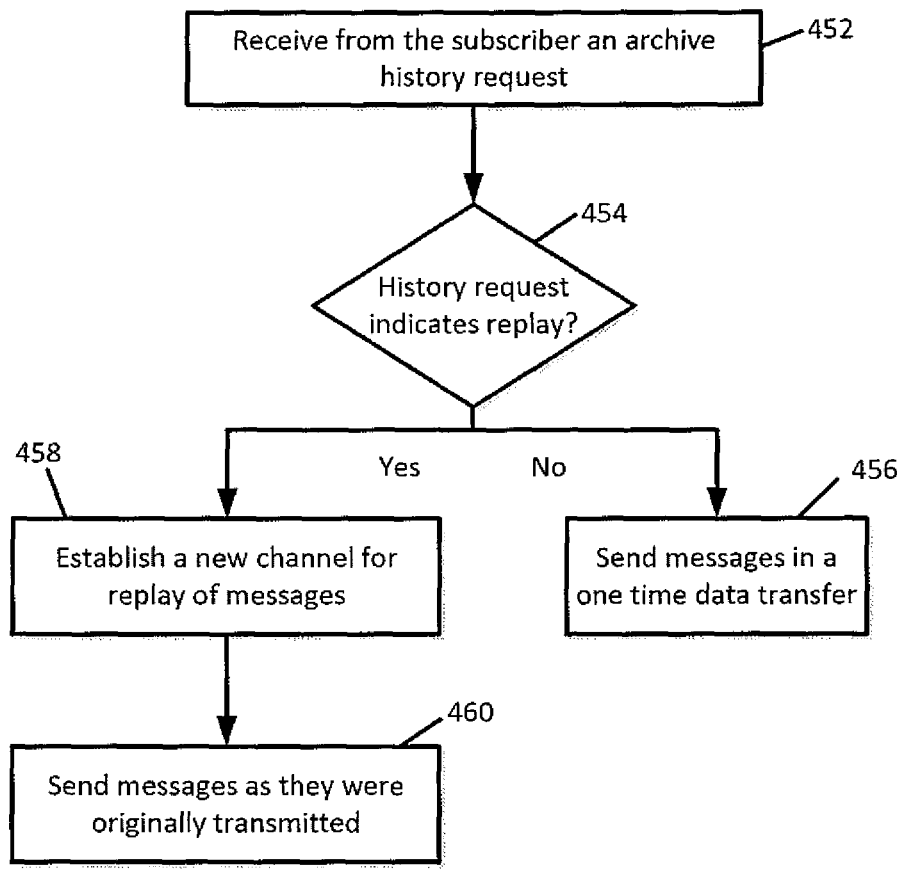
FIG. 5 is a flow chart depicting a process for use in a data center.

Referring now to FIG. 5, a flow chart depicting process 450 is provided. Process 450 begins at step 452 when the data center receives an archive history request from a subscriber client. A subscriber client may wish to receive messages that would have otherwise expired from the data center's data collection cache. As described above, messages may be archived in a relatively permanent archive data store located on the data center or elsewhere in the cloud infrastructure, based on customer, publisher, and/or subscriber settings. When a subscriber client requests a connection with the data center, a recall of archived messages is required. The history request may include information that indicates the time period of the archived message recall. For example, a subscriber client may include an indication of a start time and an end time of an archive recall period. In another example, a start time and a duration may be used to identify the archive recall period. Alternatively, the archive history request may indicate a particular event, which an archive recall period spanning from the beginning of the event to the end of the event. The embodiments are not limited in this regard.

Upon receipt of an archive history request, a determination is made at step 454 whether the archive history request indicates a message replay. A subscriber client may wish to receive the archived messages in a single message transfer, whereby the data center sends all the selected archived messages at once. Alternatively, the subscriber client may request that the recalled messages be delivered in the same order and pace as they were originally transmitted. An example would be an application on a mobile device that provides interactive content for a television program. If the user does not watch the television program at the time it originally airs, but instead watches a rebroadcast or a recording of the television program, the user may still desire to take advantage of the interactive content. To accomplish this, the subscriber client operating on the user's device will send an archive history request to the data center for the messages transmitted during the original broadcast. If message replay is indicated, the messages will be sent from the archive in the same order and at the same time, relative to the each other, as they were originally transmitted during the original broadcast.

Referring again to FIG. 5, if the archive history request does not include an indication for message reply (454: No), the messages are sent at step 456 from the data center in a one time data transfer containing all the messages transmitted on that channel during the indicated archive recall period. If the archive history request does include an indication for message replay (454: Yes), the data center will establish a new channel at step 458 for the requesting subscriber client that will be used to "replay" the messages from the archive in the same order and pace as they were originally transmitted. At step 460, the subscriber client will subscribe to the replay channel and receive messages from the archive in the same order and at the same pace as the messages were originally sent.

The archive history request is typically a one time command, and the connection is typically not left open after the archived messages are sent to the subscriber client. However, the embodiments are not so limited, and an archive history call may include an indication that that connection between the subscriber client and the data center is to be left open for transmission of further published messages.

FIG. 5 is a flow chart depicting a process 500. Process 500 illustrates an embodiment of a fail-over procedure on a data center routing node. At step 502, a DNS query is received from a subscriber or publisher client. At step 504, it may be determined whether MRR is enabled for the domain name used by the subscriber or publisher client. As described above, the customer can choose whether to enable MRR for their subscriber and publisher clients. This determination may be made at any time, such as when the message distribution system is set up and can be changed by the customer from time to time. For example, if a customer wishes to enable MRR for their subscriber and publisher clients, the unique domain name assigned to that customer will be entered into a geographic DNS service. Going forward, when the client issues a DNS query, the customer domain name resolves to the nearest data center to the client's current location. Alternatively, if MRR is not enabled, the customer domain name resolves to a predetermined or pre-configured data center.

Referring again to FIG. 5, if the domain name is not MRR enabled (504: No), the request or message is routed to a configured data center at step 506. Alternatively, if the domain name is MRR enabled (504: Yes), the closest data center to the subscriber and/or publisher is found at step 508. As discussed above, the method for finding the closest data center can be any method of geolocating a server based on a user location, e.g. GeoDNS.

Once the closest data center is found, the process 500 then checks the status of the data center at step 510. A monitoring node is located on each data center, as discussed above. The monitoring node receives and transmits pings to the data center routing node. If the data center found at step 508 is active (510: Yes), i.e. that data center has returned a ping after the last transmission of monitoring data, the messages is routed to that data center. If the data center found in step 508 is not active (510: No), the data center routing node finds the next closest data center in step 512. The process returns to step 510, where it is determined whether the data center found in step 512 is active using the same monitoring process described above. If that data center is not active, steps 510 and 512 repeat until an active data center is found. If an active data center is found (510: Yes), the request or message is routed to that data center at step 508.

Figure 6:
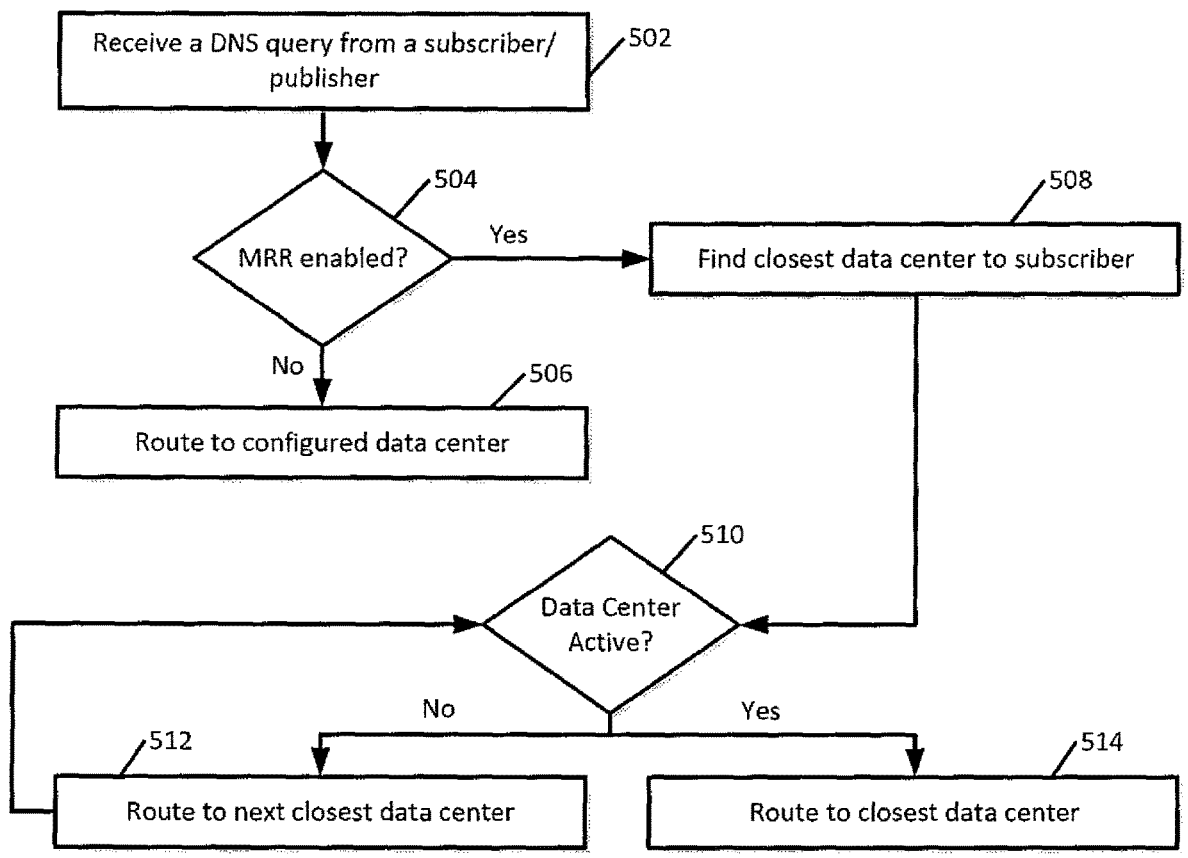
FIG. 6 is a flow chart depicting a process for use in a data center routing node.
Figure 7:
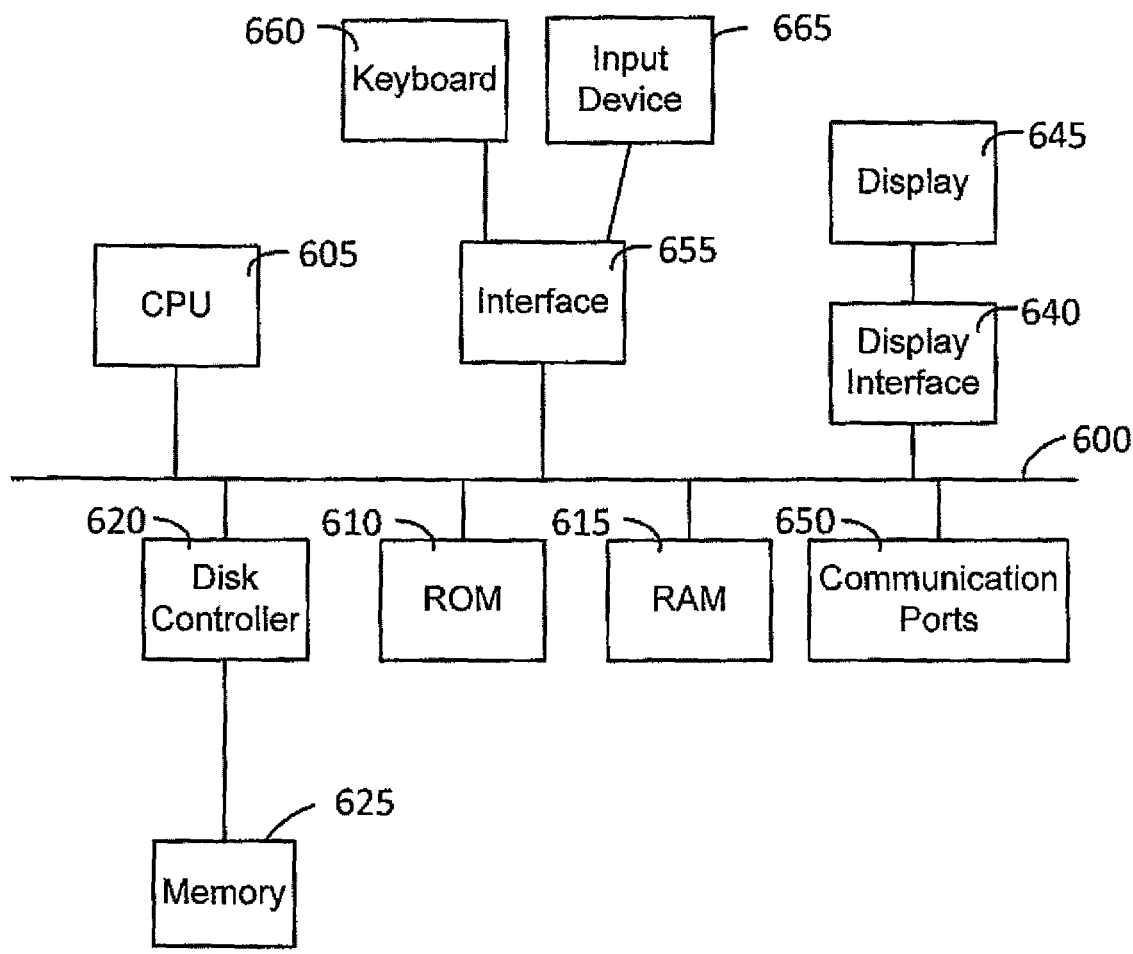
FIG. 7 is a block diagram of elements of a computer system on which the various systems in this document could be implemented.

FIG. 6 is a block diagram of a computer system on which the various systems described above could be implemented. Computer system 610 may include at least one processor 651, which communicates with a number of peripheral devices via bus subsystem 641. These peripheral devices may include a storage subsystem 611, comprising for example memory devices 631, 632 and a file storage subsystem 623, user interface input devices 625, user interface output devices 655, and a network interface subsystem 653. The input and output devices allow user interaction with computer system 610. Network interface subsystem 653 provides an interface to a communication network and is coupled via the communication network to corresponding interface devices in other computer systems. The communication network may comprise many interconnected computer systems and communication links. These communication links may be wireline links, optical links, wireless links, or any other mechanisms for communication of information. In one implementation, the communication network attached to the interface is the Internet. In other implementations, the communication network may be any suitable computer network.

User interface input devices 625 may include a keyboard; pointing devices such as a mouse, trackball, touchpad, or graphics tablet; a scanner; a touchscreen incorporated into the display; audio input devices such as voice recognition systems or microphones; and other types of input devices. In general, use of the term "input device" is intended to include possible types of devices and ways to input information into computer system 610 or onto the communication network.

User interface output devices 655 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as via audio output devices. In general, use of the term "output device" is intended to include all possible types of devices and ways to output information from computer system 610 to the user or to another machine or computer system.

Storage subsystem 611 stores programming and data constructs that provide the functionality of some or all of the modules described throughout this disclosure. These software modules are generally executed by processor 651 alone or in combination with other processors.

Memory 621 used in the storage subsystem can include a number of memories including a main random access memory (RAM) 632 for storage of instructions and data during program execution and a read only memory (ROM) 631 in which fixed instructions are stored. A file storage subsystem can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 623 of the storage subsystem 611, or in other machines accessible by the processor.

Bus subsystem 641 provides a mechanism for letting the various components and subsystems of computer system 610 communicate with each other as intended. Although bus subsystem 641 is shown schematically as a single bus, alternative embodiments of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as an example using a so-called particular computer adapted by programming instructions to perform as disclosed. Many other configurations of computer system 610 are possible having additional or fewer components than the computer system depicted in FIG. 6.

The present disclosure describes a number of methods and systems that may help solve certain problems of conventional cloud-based computing systems. For example, the embodiments of the present disclosure distribute messages quickly to multiple data centers around the world. This may result in increased performance and low latency for applications running in different, geographically disparate regions. Additionally, the resilient, real-time infrastructure may provide an automatic fail-over when the loss of a data center occurs, while maintaining the state of the real-time data stream. In various embodiments, data and time synchronization across multiple regions ensures allows a variety of subscribing clients in many regions receive most or all of the same data with minimal latency and delay. A mechanism for time stamping each real-time message with a time token (e.g., to the nearest nanosecond) ensures proper ordering and recording of each message received and delivered.

One focus of the present disclosure is on maintaining low-latency. For example, if the service is used to send messages relating to a multi-player video game, when one user takes an action in the game, an opposing player should see that action in real-time, regardless of the relative locations of the two players around the world. Similarly, if the service is used to send real-time news updates, play-by-play calls of a sporting event, or other real-time data, the system also may need to be broadcast in real time across all locations. Therefore, messages that reflect a user's actions must be replicated to all global data centers as fast as possible. As used in this document, "real time" means that an action occurs virtually immediately, without introduction of any delay other than that which may be present based on inherent limitations of the network and processing.

Another focus is on resiliency for devices with unreliable internet connectivity, e.g. mobile phones. When a user goes through a tunnel, enters an elevator, or hands-off to a different radio technology (e.g. LTE to WiFi), the user's connection to the Internet is temporarily disrupted. After the device reconnects to the data center via a channel, the methods and systems of the present disclosure allow the user to "catch-up" on messages that were sent during the connectivity disruption.

The methods and systems disclosed in this document represent a trade-off between reliability and low-latency. Unlike other message delivery and replication systems that guarantee data delivery, the disclosed methods and systems do not provide a guarantee that each and every message will be delivered to a subscriber. Rather, the disclosed methods enable very low-latency applications to receive messages quickly and reliably across multiple geographic regions. Through the use of low-latency, resilient, and redundant data centers, the disclosed methods and systems provide support for publishers physically located in different regions to publish their messages on the same channel.

While the present invention is disclosed by reference to the implementations and examples detailed above, it is understood that these examples are intended in an illustrative rather than in a limiting sense. Computer-assisted processing is implicated in the described implementations. Accordingly, the present technologies may be embodied in methods for browsing large sets of contacts, systems including logic and resources browse large sets of contacts, systems that take advantage of computer-assisted methods for browsing or searching large sets of contacts, non-transitory memory impressed with logic to browse large sets of contacts, data streams impressed with logic to browse large sets of contacts, or computer-accessible services that carry out computer-assisted methods for browsing large sets of contacts. It is contemplated that modifications and combinations will be within the scope of the following claims.

The invention claimed is:

1. A method of distributing messages to subscribers via a cloud computing system, the method comprising:
   by a first data center of a cloud computing system:
      receiving a plurality of messages from a publisher,
      saving the plurality of messages in a data collection at the first data center,
      for each of the plurality of messages, saving a time token to the data collection with the message, wherein the time token for each message includes an indicator of a time at which the message was received by the first data center, and
      sending the messages and the time tokens for the messages in real time from the first data center to a plurality of additional data centers of the cloud computing system in multiple geographic locations so that the data collection is replicated among each of the data centers of the cloud computing system to enable low-latency delivery of the plurality of messages in the multiple geographic locations; and
   by a second data center of the additional data centers:
      receiving a credential and a subscriber time token from a subscriber when the second data center is more geographically proximate to a client device of the subscriber than the first data center is to the client device of the subscriber, wherein the subscriber time token is the assigned time token which is assigned to a previous message that the subscriber has received from the cloud computing system,
      based on the credential, verifying that the subscriber is an authorized subscriber,
      determining whether the second data center holds any messages which the authorized subscriber has not yet received and identifying messages from the data collection of the second data center that the authorized subscriber is eligible to receive and which have time tokens indicating that the messages were published after a time indicated by the subscriber time token, and
      sending each identified message to the client device of the authorized subscriber.

2. The method of claim 1, further comprising:
   identifying an expiration time; and
   by each of the data centers, automatically deleting, from its data collection, each message having a time token that is earlier than the expiration time.

3. The method of claim 1, further comprising:
   by the first data center, receiving an additional message for distribution to a plurality of clients;
   determining that the additional message is not eligible for regional duplication; and
   saving the additional message at the first data center without sending the additional message to the other data centers.

4. The method of claim 1, wherein:
   the plurality of messages are received for publication on a channel;
   verifying that the subscriber is an authorized subscriber comprises verifying that the subscriber has subscribed to the channel; and
   identifying messages from the data collection of the second data center that the subscriber is eligible to receive comprises identifying messages that are available for publication by the second data center on the channel.

5. The method of claim 1, wherein:
   the plurality of messages are received for publication on a channel;
   verifying that the subscriber is an authorized subscriber comprises verifying that the subscriber has subscribed to the channel;
   the credential and the subscriber time token are received with an archive history request that includes an indication for message replay; and
   sending each identified message to the client device of the subscriber comprises retrieving messages from an archive, establishing a new channel to replay the messages, and sending the retrieved messages to the client device on the new channel in an order that is as the retrieved messages were originally transmitted.

6. The method of claim 1, wherein sending each identified message to the client device of the subscriber comprises, by the second data center:
   for each message that the subscriber is eligible to receive, detecting whether any message requires that the message not be broadcast to subscribers in a local time zone of the second data center until a later time; and
   for each such message, incorporating a delay period and not publishing the message to the subscriber until a later time that is after the delay period.

7. The method of claim 1, wherein:
   the data collection comprises a cache that is regularly purged; and
   saving the messages to the data collection comprises, for each of the messages:

determining whether the message is indicated for long term storage, and when the message is not indicated for long term storage, also storing the message to an archive.

8. A method of distributing messages to subscribers via a cloud computing system, the method comprising:

by a second data center of a cloud computing system that includes multiple data centers that are located in a variety of geographic regions:

receiving, from a first data center that is located in a different geographic region than that of the second data center, a plurality of messages from a publisher, wherein each of the messages is associated with an assigned time token, saving the messages and the assigned time tokens in real time at the second data center in a data collection to replicate a data collection of the first data center for low-latency delivery of the messages in the geographic region of the second data center, for each of the plurality of messages, saving the time token for the message to the data collection at the second data center with the message, wherein the time token includes an indicator of a time at which the message was received by the first data center, receiving a credential and a subscriber time token from a subscriber that is more geographically proximate to the second data center than to the first data center, wherein the subscriber time token corresponds to a time token that was assigned to a previous message that the subscriber received from a data center of the cloud computing system other than the second data center, based on the credential, verifying that the subscriber is an authorized subscriber, determining whether the second data center holds any messages which the authorized subscriber has not yet received and identifying messages from the data collection that the authorized subscriber is eligible to receive and which were published after a time indicated by the subscriber time token, and sending each identified message to the client device of the authorized subscriber.

9. The method of claim 8, further comprising, by the second data center:

identifying an expiration time; and automatically deleting, from the data collection of the second data center, each message having a time token that is earlier than the expiration time.

10. The method of claim 8, wherein:

the plurality of messages are received for publication on a channel;

verifying that the subscriber is an authorized subscriber comprises verifying that the subscriber has subscribed to the channel; and identifying messages that the second data center holds in its data collection and which the subscriber is eligible to receive comprises identifying messages that are available for publication by the second data center on the channel.

11. The method of claim 8, wherein:

the plurality of messages are received for publication on a channel;

verifying that the subscriber is an authorized subscriber comprises verifying that the subscriber has subscribed to the channel;

the credential and the subscriber time token are received with an archive history request that includes an indication for message replay; and sending each identified message to the client device of the subscriber comprises retrieving messages from an archive, establishing a new channel to replay the messages, and sending the retrieved messages to the client device on the new channel in an order that is as the retrieved messages were originally transmitted.

12. The method of claim 8, wherein sending each identified message to the client device of the subscriber comprises, by the second data center:

for each message that the subscriber is eligible to receive, detecting whether any message requires that the message not be broadcast to subscribers in a local time zone of the second data center until a later time; and for each such message, incorporating a delay period and not publishing the message to the subscriber until a later time that is after the delay period.

13. The method of claim 8, wherein:

the data collection comprises a cache that is regularly purged; and saving the messages to the data collection of the second data center comprises, for each of the messages:

determining whether the message is indicated for long term storage, and when the message is not indicated for long term storage, also storing the message to an archive.

\* \* \* \* \*